A. VIERS & R. D. SCOTT.
FISHING TACKLE.
APPLICATION FILED JAN. 12, 1914.
1,110,246.
Patented Sept. 8, 1914.
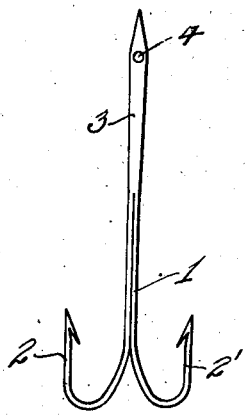
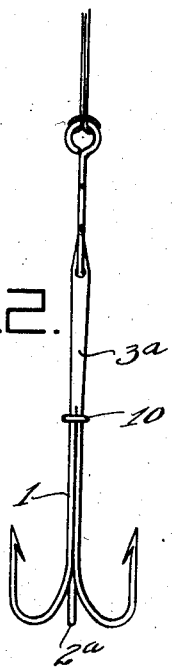
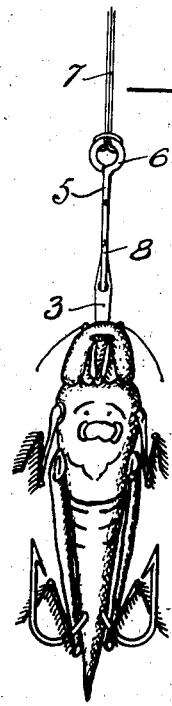
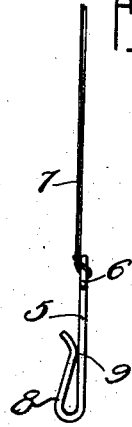

UNITED STATES PATENT OFFICE.

ARTHUR VIERS AND ROBERT D. SCOTT, OF RED LODGE, MONTANA.

FISHING-TACKLE.

1,110,246.  Specification of Letters Patent.  Patented Sept. 8, 1914.

Application filed January 12, 1914. Serial No. 811,722.

*To all whom it may concern:*

Be it known that we, ARTHUR VIERS and ROBERT D. SCOTT, citizens of the United States, residing at Red Lodge, in the county of Carbon and State of Montana, have invented certain new and useful Improvements in Fishing-Tackle, of which the following a specification.

The present invention relates to improvements in fishing tackle, the object in view being to provide a hook member formed from a single piece of wire bent back upon itself and flattened at its bent portion to form an integral piercing shank upon which the bait is adapted to be impaled, the free terminals of the wire forming spaced barbed points.

Another object of the invention is to provide a hook connecting element for connecting the hook member aforesaid to the line, which element is adapted to coöperate with said hook member by frictionally engaging the same to hold it in alinement with the hook connecting element.

With the above and other objects in view, this invention consists in the construction, combination and arrangement of parts all as hereinafter more fully described, claimed and illustrated in the accompanying drawings, wherein—

Figure 1 is a view in elevation of a hook member constructed in accordance with our invention. Fig. 2 is a slightly modified form of hook member connected by means of the hook connecting element to a line. Fig. 3 illustrates the preferred embodiment of my invention with the bait impaled thereupon. Fig. 4 is a side elevation of the hook connecting element carried by the line and upon which the hook member is mounted.

Throughout the following detail description, and on the several figures of the drawings, similar parts are referred to by like reference characters.

While it has been proposed heretofore to employ a separate hook member which comprises a piercing shank, difficulty is experienced in actual use of the fishing tackle in disconnecting the hook member from the connecting element which connects the same to the fishing line, when the hook member has been swallowed by a fish caught thereupon. In order to accomplish the separating function just mentioned, it has been necessary to insert the finger into the fish's mouth in order to disconnect the connecting element from the hook member, and this is disadvantageous where such action would result in injury to the fish or where the piercing shank has descended into the throat of the same making access to the connecting element difficult.

It, therefore has been an object of my invention to arrange a particular formed hook member so as to coöperate with a hook connecting element that may be readily disengaged from the hook element by relative movement of these parts toward each other. This will become evident as this description proceeds, and referring to the drawing, the numeral 1 designates a hook member which comprises a single piece of wire bent back upon itself and having its terminals bent upwardly so as to form the spaced barbed points 2, 2'. The upper portion of the wire is then mashed or flattened so as to form the integral or brazed sharpened piercing shank 3, through which an opening 4 extends for connecting the hook member to the line as will now be described.

In Fig. 4 is shown a hook connecting element 5 having an eye 6 at one end through which is looped the leader 7 or the line as the case may be and the other end of said member is bent back to form a hook portion 8, which hook portion is bent near the upper end until it frictionally contacts with the adjacent shank at the point indicated by the numeral 9. It will be obvious that the formation in this connecting element as thus described forms practically a closed hook and when the piercing shank 3 of the hook member 1 is inserted in the hook 8, accidental disengagement of the same from the hook connecting element is prevented. In addition to preventing this disengagement, the bending of the hook 8 so as to frictionally contact with the shank of the hook connecting element is designed to bind the upper pointed extremity of the shank 3 between the terminal and the body portion of the connecting member 5 thereby holding the hook member in alinement with the hook connecting element as is most clearly shown in Fig. 3 of the drawing.

The formation of the hook member from a single piece of wire bent back upon itself is advantageous as the flattening of the shank simultaneously forms a piercing member which enables the impalement of the bait upon the hook without damaging said bait or weakening the same where minnows are employed as bait. It furthermore enables the extraction of the hook from a fish when caught upon the barbed terminals 2, 2' without considerable injury to the fish and the connecting member 5 as described enables the disengagement of the hook member in an advantageous manner hereinbefore mentioned. Not only does the formation of the hook from the single piece of wire become advantageous for the foregoing reason but enables a double hook to be formed, the spaced barbed terminals preventing the bait from turning around on the shank as is very often the case where a single hook is used.

In Fig. 2 the hook member 1 is formed similarly to that described for the preferred embodiment with the addition of a third hook 2ª which is flattened into a piercing shank 3ª thereby forming a triple barbed pointed member. As desired prior to the flattening of the shank 3 a ring member 10 is inserted over the shank and down upon the lower portion of the same, for the purpose of holding the branching portions tightly together.

Having thus described the invention, what we claim as new is:—

In a fishing tackle, the combination of a line, a hook member comprising a shank constituting a piercing element, and connecting means intermediate the shank and the line comprising a hook portion bent back upon its main portion to form a yielding clamp, said shank being clamped by the hook portion to frictionally hold the hook member in alinement with the connecting means.

In testimony whereof we affix our signatures in presence of two witnesses.

ARTHUR VIERS.
ROBERT D. SCOTT.

Witnesses:
D. G. O'SHEA,
E. A. LOGAN.